US008788943B2

(12) United States Patent
Borst et al.

(10) Patent No.: US 8,788,943 B2
(45) Date of Patent: Jul. 22, 2014

(54) UNLOCKING EMOTICONS USING FEATURE CODES

(75) Inventors: Karl Joseph Borst, Toronto (CA); John Alexander Larsen, Toronto (CA)

(73) Assignee: GANZ, Woodbridge, Ontario (CA)

( * ) Notice: Subject to any disclaimer, the term of this patent is extended or adjusted under 35 U.S.C. 154(b) by 270 days.

(21) Appl. No.: 12/780,372

(22) Filed: May 14, 2010

(65) Prior Publication Data

US 2010/0293473 A1 Nov. 18, 2010

Related U.S. Application Data

(60) Provisional application No. 61/178,597, filed on May 15, 2009.

(51) Int. Cl.
*G06F 3/00* (2006.01)
*G06F 3/06* (2006.01)

(52) U.S. Cl.
USPC ............ 715/741; 715/764; 715/810; 715/760

(58) Field of Classification Search
USPC .......................................... 715/810, 764, 741
See application file for complete search history.

(56) References Cited

U.S. PATENT DOCUMENTS

| | | | | |
|---|---|---|---|---|
| 4,740,890 | A * | 4/1988 | William | 726/31 |
| 5,606,652 | A | 2/1997 | Silverbrook | |
| 5,659,692 | A | 8/1997 | Poggio et al. | |
| 5,682,469 | A | 10/1997 | Linnett et al. | |
| 5,684,943 | A | 11/1997 | Abraham et al. | |
| 5,736,982 | A | 4/1998 | Suzuki et al. | |
| 5,880,731 | A | 3/1999 | Liles et al. | |
| 5,886,697 | A | 3/1999 | Naughton et al. | |
| 6,072,466 | A | 6/2000 | Shah et al. | |
| 6,219,045 | B1 | 4/2001 | Leahy et al. | |

(Continued)

FOREIGN PATENT DOCUMENTS

| | | |
|---|---|---|
| GB | 2365364 | 2/2002 |
| JP | 2001-321571 A | 11/2001 |

(Continued)

OTHER PUBLICATIONS

Grace, "Web Site Tycoon's Next Goal: Sixth Grade"; Woonsocket Call, Jun. 19, 2002.

(Continued)

*Primary Examiner* — Amy Ng
*Assistant Examiner* — Erik Stitt
(74) *Attorney, Agent, or Firm* — Pearne & Gordon LLP

(57) ABSTRACT

Provided is a method of making a graphic available to be transmitted over a communication network. Access is granted to a graphic that a sender of a first communication can select for inclusion in the first communication to be transmitted over the communication network. Selection by the sender of a restricted graphic for inclusion in the first communication is prevented. Using a computer operatively connected to the communication network, the content of the first communication entered by the sender is received, and includes the graphic available for selection by the sender. The first communication including the graphic is transmitted over the communication network. A code associated with a product is received, and the product is registered based at least in part on the code. In response to successful registration of the product, the sender is granted access to the restricted graphic, allowing the sender to select the restricted graphic for inclusion in a second communication.

4 Claims, 7 Drawing Sheets

(56) References Cited

U.S. PATENT DOCUMENTS

| | | |
|---|---|---|
| 6,227,966 B1 | 5/2001 | Yokoi |
| 6,268,872 B1 | 7/2001 | Matsuda et al. |
| 6,290,566 B1 | 9/2001 | Gabai et al. |
| 6,388,665 B1 | 5/2002 | Linnett et al. |
| 6,389,375 B1 | 5/2002 | Thomsen et al. |
| 6,394,872 B1 | 5/2002 | Watanabe et al. |
| 6,396,509 B1 | 5/2002 | Cheng |
| 6,404,438 B1 | 6/2002 | Hatlelid et al. |
| 6,476,830 B1 | 11/2002 | Farmer et al. |
| 6,493,001 B1 | 12/2002 | Takagi et al. |
| 6,519,771 B1 | 2/2003 | Zenith |
| 6,522,333 B1 | 2/2003 | Hatlelid et al. |
| 6,559,863 B1 | 5/2003 | Megiddo |
| 6,720,949 B1 | 4/2004 | Pryor et al. |
| 6,722,973 B2 | 4/2004 | Akaishi |
| 6,734,885 B1 | 5/2004 | Matsuda |
| 6,772,195 B1 | 8/2004 | Hatlelid et al. |
| 6,773,325 B1 | 8/2004 | Mawle et al. |
| 6,813,605 B2 | 11/2004 | Nakamura et al. |
| 6,910,186 B2 | 6/2005 | Kim |
| 6,948,131 B1 | 9/2005 | Neven et al. |
| 6,992,654 B2 | 1/2006 | Boswell et al. |
| 7,037,166 B2 | 5/2006 | Shrock et al. |
| 7,042,440 B2 | 5/2006 | Pryor et al. |
| 7,058,897 B2 | 6/2006 | Matsuda |
| 7,061,493 B1 | 6/2006 | Cook et al. |
| 7,081,033 B1 | 7/2006 | Mawle et al. |
| 7,086,005 B1 | 8/2006 | Matsuda |
| 7,089,083 B2 | 8/2006 | Yokoo et al. |
| 7,143,358 B1 | 11/2006 | Yuen |
| 7,155,680 B2 | 12/2006 | Akazawa et al. |
| 7,171,154 B2 | 1/2007 | Fujisawa et al. |
| 7,181,690 B1 | 2/2007 | Leahy et al. |
| 7,210,104 B2 | 4/2007 | Nakagawa et al. |
| 7,307,618 B2 | 12/2007 | Boswell et al. |
| 7,379,066 B1 | 5/2008 | Ostermann et al. |
| 7,386,799 B1 | 6/2008 | Clanton et al. |
| 7,396,281 B2 | 7/2008 | Mendelsohn et al. |
| 7,425,169 B2 | 9/2008 | Ganz |
| 7,442,108 B2 | 10/2008 | Ganz |
| 7,465,212 B2 | 12/2008 | Ganz |
| 7,488,231 B2 | 2/2009 | Weston |
| 7,534,157 B2 | 5/2009 | Ganz |
| 7,549,119 B2 | 6/2009 | McCaffrey et al. |
| 7,568,964 B2 | 8/2009 | Ganz |
| 7,604,525 B2 | 10/2009 | Ganz |
| 7,618,303 B2 | 11/2009 | Ganz |
| 7,647,560 B2 * | 1/2010 | Macauley et al. ............ 715/758 |
| 7,677,948 B2 | 3/2010 | Ganz |
| 7,789,726 B2 | 9/2010 | Ganz |
| 7,908,324 B2 | 3/2011 | Shochet et al. |
| 2001/0049596 A1 | 12/2001 | Lavine et al. |
| 2002/0036617 A1 | 3/2002 | Pryor |
| 2002/0040327 A1 | 4/2002 | Owa |
| 2002/0113809 A1 | 8/2002 | Akazawa et al. |
| 2002/0130894 A1 | 9/2002 | Young et al. |
| 2002/0198940 A1 | 12/2002 | Bower et al. |
| 2003/0055779 A1 * | 3/2003 | Wolf .............................. 705/39 |
| 2003/0220834 A1 | 11/2003 | Leung et al. |
| 2004/0043806 A1 | 3/2004 | Kirby et al. |
| 2004/0046736 A1 | 3/2004 | Pryor et al. |
| 2004/0093266 A1 | 5/2004 | Dohring |
| 2004/0153557 A1 | 8/2004 | Shochet et al. |
| 2004/0179038 A1 * | 9/2004 | Blattner et al. ............... 345/751 |
| 2004/0179039 A1 | 9/2004 | Blattner et al. |
| 2004/0242326 A1 | 12/2004 | Fujisawa et al. |
| 2005/0059483 A1 | 3/2005 | Borge |
| 2005/0116956 A1 | 6/2005 | Beardow |
| 2005/0163379 A1 * | 7/2005 | Zimmermann ............... 382/190 |
| 2005/0216568 A1 * | 9/2005 | Walkush et al. .............. 709/207 |
| 2005/0223078 A1 | 10/2005 | Sato et al. |
| 2005/0250415 A1 | 11/2005 | Barthold |
| 2005/0250416 A1 | 11/2005 | Barthold |
| 2006/0064761 A1 * | 3/2006 | Multerer et al. ................. 726/27 |
| 2006/0166593 A1 | 7/2006 | Shrock et al. |
| 2006/0293103 A1 | 12/2006 | Mendelsohn et al. |
| 2007/0050716 A1 | 3/2007 | Leahy et al. |
| 2007/0124673 A1 | 5/2007 | Trotto et al. |
| 2007/0143679 A1 | 6/2007 | Resner |
| 2007/0218987 A1 | 9/2007 | Van Luchene et al. |
| 2007/0250587 A1 | 10/2007 | Roberts |
| 2007/0266090 A1 | 11/2007 | Len |
| 2008/0009350 A1 | 1/2008 | Ganz |
| 2008/0009351 A1 | 1/2008 | Ganz |
| 2008/0040230 A1 | 2/2008 | Ganz |
| 2008/0059570 A1 | 3/2008 | Bill |
| 2008/0109313 A1 | 5/2008 | Ganz |
| 2008/0134099 A1 | 6/2008 | Ganz |
| 2008/0163055 A1 | 7/2008 | Ganz et al. |
| 2008/0163379 A1 | 7/2008 | Robinson et al. |
| 2008/0215974 A1 | 9/2008 | Harrison et al. |
| 2008/0221998 A1 | 9/2008 | Mendelsohn et al. |
| 2008/0250332 A1 | 10/2008 | Farrell et al. |
| 2009/0019117 A1 * | 1/2009 | Bonforte et al. .............. 709/206 |
| 2009/0029772 A1 | 1/2009 | Ganz |
| 2009/0053970 A1 | 2/2009 | Borge |
| 2009/0054155 A1 | 2/2009 | Borge |
| 2009/0063282 A1 | 3/2009 | Ganz |
| 2009/0131164 A1 | 5/2009 | Ganz |
| 2009/0164916 A1 | 6/2009 | Jeong et al. |
| 2009/0177976 A1 | 7/2009 | Bokor et al. |
| 2009/0204420 A1 | 8/2009 | Ganz |
| 2010/0030660 A1 | 2/2010 | Edwards |
| 2010/0151940 A1 | 6/2010 | Borge |
| 2010/0169801 A1 | 7/2010 | Blattner et al. |
| 2010/0172287 A1 * | 7/2010 | Krieter .......................... 370/328 |
| 2010/0203968 A1 * | 8/2010 | Gill et al. ........................ 463/32 |
| 2011/0105220 A1 * | 5/2011 | Hill et al. ........................ 463/29 |
| 2012/0059787 A1 | 3/2012 | Brown et al. |

FOREIGN PATENT DOCUMENTS

| | | |
|---|---|---|
| JP | 2001-522498 T | 11/2001 |
| JP | 2002-055935 A | 2/2002 |
| JP | 2002063092 | 2/2002 |
| WO | 99/42917 A2 | 8/1999 |
| WO | 2006-128224 A1 | 12/2006 |

OTHER PUBLICATIONS

Carriere Entertainment, Inc.: http://web.archive.org.web.20031202190119/www.monopets.com/, Dec. 2, 2003.

Klotz; "Look out, Pokemon; Neopets are taking over;" [Final Edition] Southam Publications, Ottawa Citizen, pp. 1-4, (Feb. 7, 2000).

GoPets, Ltd; "What is a GoPet?" www.gopets.net, , pp. 1-3, Jul. 10, 2007.

Matsuda; "Evaluation of Personal Agent Oriented Virtual Society—PAW", Presence, vol. 10, No. 2, Apr. 2, 2001, pp. 160-174.

Lehdonvirta; "Real-Money Trade of Virtual Assets: Ten Different User Perceptions", Helsinki Institute for Information Technology, pp. 1-7, (2005).

International Search Report, PCT/CA2009/000271, Sep. 7, 2010.

* cited by examiner

: )
FIG. 3a
: O
FIG. 3c
: (
FIG. 3e
: D
FIG. 3b
|: \
FIG. 3d
FIG. 4a
FIG. 4c
FIG. 4e
FIG. 4b
FIG. 4d

UNLOCKING EMOTICONS USING FEATURE CODES

CROSS-REFERENCE TO RELATED APPLICATIONS

This application claims the benefit of U.S. Provisional Application No. 61/178,597, filed May 15, 2009, the entirety of which is incorporated herein by reference.

TECHNICAL FIELD

This application relates generally to a method and system for providing a chat function to facilitate communications between users over a communication network and, more specifically, to a method and system for granting access to a graphical icon that can be presented to one of the users by another one of the users in response to registration of a code associated with a product.

BACKGROUND OF THE INVENTION

One form of electronic communication is chatting. Chatting has traditionally involved the synchronous, real-time transmission of messages between two or more participants. Text or other suitable content can be entered by a sender into a chat interface displayed on a computer. When the sender has finished entering the content to be delivered to the recipient the sender can initiate transmission of the content over the Internet or other suitable communication network to one or more recipients. The content transmitted by the sender is made available for viewing by the recipient(s) through a similar chat interface operating on another computer that is remotely-located from the sender's computer. Since the content included in an instant message transmitted during a chat session is available for viewing shortly after being transmitted by the sender, participants can engage in a back-and-forth electronic conversation while chatting.

In addition to the transmission of text, chatting has also involved sending graphics to the recipient(s) of a message. An example of a graphic transmitted as part of an electronic communication such as chatting is what is commonly referred to as an emoticon. Early emoticons were a combination of text characters such as brackets and various punctuation marks that collectively resembled a facial expression. More-recently, however, emoticons have evolved into simple graphical facial expressions representing different emotions. Graphics such as emoticons have been included in messages to be transmitted while chatting to convey the mood or sentiment of the sender of a particular message. However, all users of a chat interface are presented with the same menu of available emoticons from which they can choose the emoticons they would like to include in their messages. Offering the same standardized menu of emoticons available to all users limits the ability of users to express their individuality, and may result in users losing interest in that form of communication.

SUMMARY

According to one aspect, the subject application involves a graphic to be transmitted over a communication network.

An embodiment includes granting access to a graphic that a sender of a first communication can select for inclusion in the first communication to be transmitted over the communication network. Selection by the sender of a restricted graphic for inclusion in the first communication is prevented. Using a computer operatively connected to the communication network, content of the first communication entered by the sender is received. The content includes the graphic available for selection by the sender. The first communication comprising the graphic is transmitted over the communication network, and a code associated with a product is received. The product is registered based at least in part on the code and, in response to successful registration of the product, the sender is granted access to the restricted graphic, allowing the sender to select the restricted graphic for inclusion in a second communication. Subsequent to allowing selection of the restricted graphic, the embodiment describes using the computer operatively connected to the communication network, content of the second communication entered by the sender is received, and includes the restricted graphic.

According to another aspect, the subject application involves a method of modifying a graphic to be transmitted over a communication network. The method includes granting access to a graphic that a sender of a communication can select for inclusion in the communication to be transmitted over the communication network. The graphic includes an appearance representative of an emotion. An editing tool including a plurality of modification options available to the sender for editing the graphic is offered, and a selection by the sender of a desired modification option is received. The graphic is modified pursuant to the selection by the sender resulting in a modified graphic, the modified graphic is saved in a non-transient computer-readable memory, and the modified graphic is associated with the communication. The communication comprising the modified graphic is transmitted over the communication network.

According to another aspect a graphic is transmitted over a communication network. The method includes presenting a virtual character to a sender of a first chat message to be transmitted in real time during a synchronous communication session. The virtual character is controllable by the sender during participation in an activity on a website and the sender is associated with a user account. Access is granted to a graphic that the sender can select for inclusion in the first chat message to be transmitted over the communication network. The graphic includes an appearance representative of an emotion. Selection by the sender of a restricted graphic for inclusion in the first chat message is prevented. The restricted graphic comprises an appearance representative of another emotion that is different than the emotion in the first chat message. A chat interface is presented on the website for entry of text to be included in the first chat message. Using a computer operatively connected to the communication network, the first chat message entered by the sender comprising the graphic available for selection by the sender and the text entered by the sender via the chat interface on the website is received. The first chat message is transmitted over the communication network to display the graphic and the text together on the website to an intended recipient of the first chat message. Received over the communication network is a code associated with a product entered by the sender on the website, and the product is registered based at least in part on the code. In response to successful registration of the product, the sender is granted access to the restricted graphic, allowing the sender to select the restricted graphic for inclusion in a second chat message to be transmitted over the communication network subsequent to the successful registration of the product. In response to successful registration of the product, the user account is also updated to reflect the successful registration of the product and to grant the sender continued access to the restricted graphic, allowing the sender to select the restricted graphic for inclusion in another chat message to be transmitted in real time during a subsequent synchronous communication session. Subsequent to granting access to the restricted graphic, and using the computer operatively connected to the communication network, the second chat message entered by the sender including the restricted graphic and another text entry entered by the sender on the website is received. The second chat message is transmitted over the communication network to display the restricted graphic and the another text entry together on the website to an intended recipient of the second chat message.

According to another aspect, a method is provided for transmitting a graphic over a communication network. The method includes, using a computer operatively connected to the communication network, displaying a first graphic in a chat interface that a sender of a first chat message can select for inclusion in the first chat message prepared by the sender using the computer to be transmitted over the communication network to a recipient. The recipient is to receive the first chat message using another computer during a chat session. The chat interface excludes from selection by the sender to be included in the first chat message a restricted graphic for inclusion in the first chat message. Using the computer, the content of the first chat message entered by the sender into the chat interface is transmitted over the communication network, the content comprising the first graphic. In response to the sender registering a manufactured good based on a code associated with the manufactured good, the chat interface displays the restricted graphic to the sender with the computer and allows selection by the sender of the restricted graphic for inclusion in a second chat message prepared with the computer to be transmitted over the communication network. Using the computer, the second chat message comprising the restricted graphic is transmitted over the communication network to be delivered to a recipient of the second chat message.

According to another aspect, a computer comprising a non-transitory, computer-accessible memory and a processor is provided. The computer is programmed with computer-executable instructions that, when executed by the processor, cause the computer to perform a method. The method includes displaying a first graphic in a chat interface that a sender of a first chat message can select for inclusion in the first chat message prepared by the sender using the computer to be transmitted over a communication network to a recipient who is to receive the first chat message using another computer during a chat session. The chat interface displayed by the computer excludes from selection by the sender for inclusion in the first chat message a restricted graphic. Content of the first chat message entered by the sender into the chat interface is transmitted over the communication network, the content comprising the first graphic. In response to the sender registering a manufactured good based on a code associated with the manufactured good, the chat interface comprising the restricted graphic is displayed to the sender and allows selection by the sender of the restricted graphic for inclusion in a second chat message prepared using the computer to be transmitted over the communication network. The second chat message including the restricted graphic is transmitted over the communication network to be delivered to a recipient of the second chat message.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIGS. 3a-3e show examples of traditional emoticons that can be included as a graphic in a message;

FIGS. 4a-4e show examples of graphical emoticons corresponding to the traditional emoticons shown in FIGS. 3a-3e;

DETAILED DESCRIPTION

Figure 1:
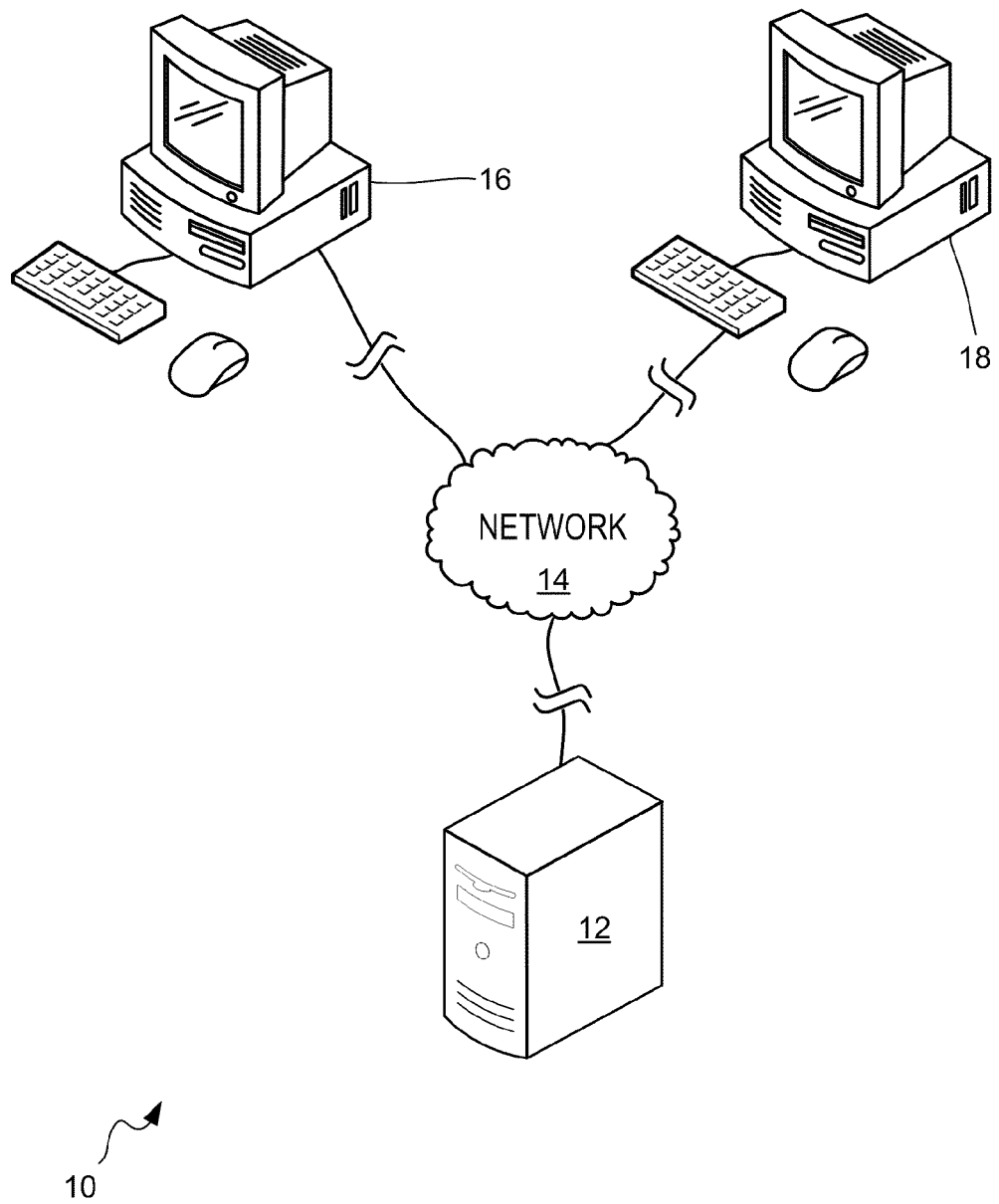
FIG. 1 shows an embodiment of a computer system for implementing a method of making a graphic available to be transmitted over a communication network as part of a communication from a sender to a recipient.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

FIG. 1 shows an illustrative embodiment of a computer system 10 for making a graphic available to be transmitted over a communication network as part of a communication from a sender to a recipient. The illustrative embodiment of the computer system 10 includes a server 12 that includes a non-transitory computer-readable memory 20 (FIG. 2) that can store information relating to user accounts, graphical user interfaces such as web pages and chat interfaces, computer-executable instructions that, when executed, implement the method steps described herein, and any other information available over a communication network 14.

The network 14 can include components of a local area network, components forming a portion of a publicly accessible wide area network such as the Internet, or a combination thereof. The communication network 14 can support any suitable communication protocol to facilitate communications between computer terminals 16, 18; game consoles such as the Microsoft® Xbox® and the Sony® PlayStation®; any other suitable electronic communication device, or a combination thereof. For purposes of clearly describing the invention, however, the electronic communication devices will be described with reference to the computer terminals 16, 18 shown in FIG. 1. Further, two computer terminals 16, 18 are shown operatively connected to the communication network 14 for illustrative purposes. However, it is to be understood that any number of computer terminals, game consoles and other electronic communication devices can be operatively connected to communicate with each other over the communication network 14.

Portions of the computer system 10 such as one or more of the computer terminals 16, 18, the server 12, or a combination thereof can be programmed with computer-executable instructions that, when executed by a processor provided to at least one of the computer terminals 16, 18 and the server 12 to perform a method of making a graphic available to be transmitted by a sender from a user computer 16 over the communication network 14 to be displayed or otherwise presented to a recipient via the other user computer 18. As schematically represented by the block diagram of FIG. 2, a user is logged into a user account 22 associated with that user, or otherwise commences participating in a network activity other than chatting such as playing a video game by accessing a website over the communication network 14 for example. The user can enter a username, password or a combination thereof into a website or other login screen presented on the user computer 16 to log into the user account, and the login information can be transmitted over the communication network 14 to the server 12 to grant the user access to the network activity. Other embodiments such as those utilizing a game console to participate in the network activity may interact with other users over the communication network 14 by accessing a host server, but without visiting a website. The network activity on the website only is described as an embodiment for the sake of brevity.

Once logged in, the user can be granted access to, and control over a virtual character on the website to play games and otherwise interact with portions of the website and others participating in games and other activities on the website. For example, the user computer 16 can include an input peripheral such as a keyboard, mouse, joystick, any other instruction entry device or a combination thereof to input instructions into the user computer 16 for controlling the virtual character. The virtual character associated with the user account that is controllable by the user can be a virtual replica of a toy purchased and registered by the user as a prerequisite to gaining access to the full-featured website. One example of such a website and virtual replica can be found at the Webkinz® website from Ganz, and described in U.S. Pat. No. 7,604,525 to Ganz, which is incorporated in its entirety herein by reference.

Upon log in, the user is provided with a standard graphics set at 23.

In addition to the virtual character, the user is also granted access to a chat interface 30 (FIG. 5), described in detail below, that enables the user to enter content to be delivered to another user on the website in real time, as part of a synchronous communication session commonly referred to as a chat session. However, the chat interface 30 includes a standard selection of graphics such as emoticons, for example, that can be added by the user to the outgoing message transmitted by the sender as described in detail below. During the chat session, the content entered by the sender into the chat interface 30 on the website presented to the sender by the user computer 16 is transmitted over the communication network 14 to be delivered to the user computer 18, which displays or otherwise presents the content to the recipient substantially in real time. The sender, also visiting the website, can also optionally see the content as presented to the recipient.

Once the user has gained access to the website, the user can purchase other toys, accessories for a toy, or any other such manufactured good that is associated with a code, and register those other products on the website using the code. Such a code is registered to gain access to restricted graphics that were not included in the standard selection of graphics. The code can be physically attached to the product purchased by the user at the time of sale, e.g., on a hidden tag or in an electronic memory. Alternatively, the code can be otherwise delivered to the user as a result of the sale of the product, e.g., at a point of sale e.g., from the cash register, or over the internet. The user can navigate to a portion of the website where a code entry interface is presented 24 in response to a request to register the product entered on the website by the user via an input peripheral provided to the user computer 16 (FIG. 1).

The code entered by the user on the website is transmitted over the communication network 14 and compared to a database of codes 26 for validation purposes or otherwise validated by the site. Validation ensures that the code entered by the user is valid, and has not been previously redeemed by the user. In response to successful registration of the product associated with the code, the user account records 20 are updated for that particular user to reflect successful registration of the product. In response, content is transmitted from the server 12 over the communication network 14 to grant the user access to, and present the user with a restricted graphic set 32, e.g., a set of emoticons such as in FIG. 8 that the user had previously been prevented from including in an outgoing message via the chat interface 34.

Figure 2:
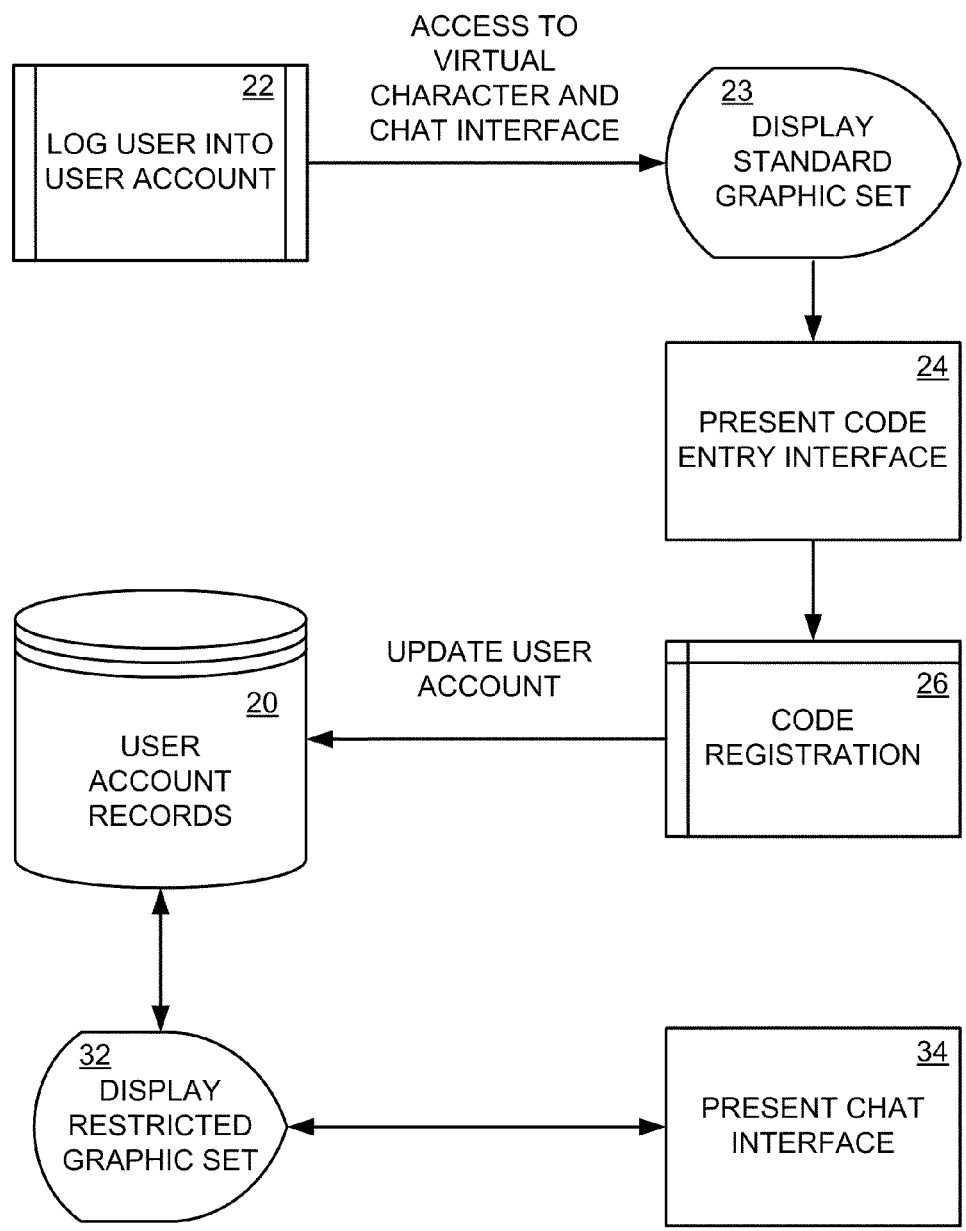
FIG. 2 shows a block diagram illustrating functional aspects of a method of making a graphic available to be transmitted over a communication network as part of a communication from a sender to a recipient.

FIG. 2 thus shows that upon accessing the website, one or more standard graphics were made available to the user at 23 from which the user could select a desired graphic to include in an outgoing chat message. In response to successfully registering the manufactured good, however, the user is granted access to one or more restricted graphics 32 that were previously unavailable to the user prior to the registration.

The graphics can be any suitable image that can be included in a message transmitted in real time during a synchronous communication session such as a chat session, which facilitates substantially-instantaneous communications between a sender and at least one recipient who are visiting the website. To clearly describe the claimed subject matter, however, the graphics referred to hereinafter are emoticons. Emoticons can include a combination of text characters such as brackets and various punctuation marks that collectively resembled a facial expression that is representative of an emotion. Examples of such traditional emoticons are shown in FIGS. 3a-3e. The emoticons discussed herein also include simple graphical facial expressions representing different emotions. The graphical facial expressions shown in FIGS. 4a-4e correspond to the traditional emoticons shown in FIGS. 3a-3e, respectively. The emoticons shown in FIGS. 3a-3e and 4a-4e are merely examples of graphics that can be included in a message, and not an exhaustive list.

FIGS. 5-8 shows an example of a virtual character 40 under the control of a user participating in an activity on a website displayed to the user via the user computer terminal 16 (FIG. 1). The virtual character 40 has a caricature-like appearance of a dog, which can optionally be a virtual replica of a plush toy dog registered by the user to gain access to the website as described in U.S. Pat. No. 7,604,525 to Ganz, which was incorporated into the present application by reference above. The virtual character 40 can be associated with a user account maintained by the user, and controlled by the user to participate in games and other activities available on the website.

Figure 5:
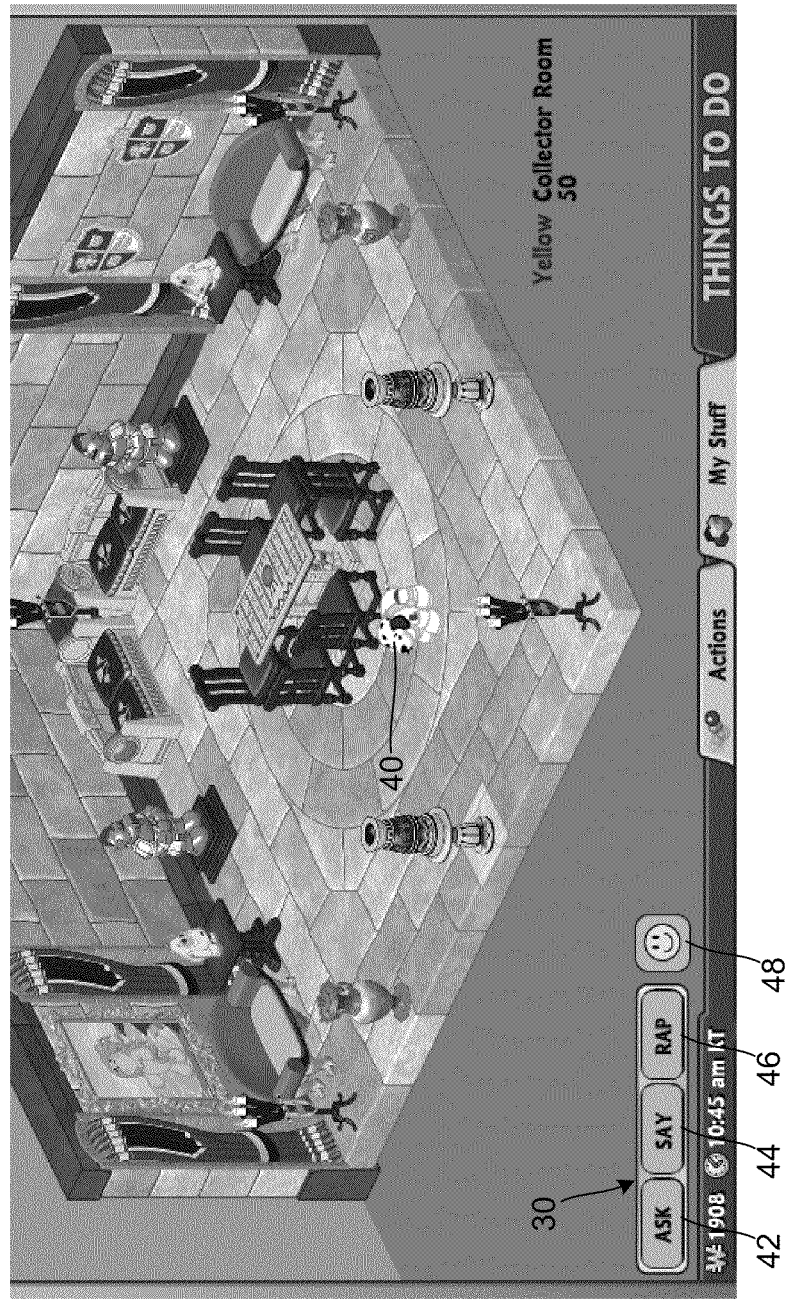
FIG. 5 shows an embodiment of a virtual character in a portion of a website including a chat interface for engaging in real-time, synchronous communications involving transmission of a graphic.

In navigating the website with the virtual character 40, the user may encounter another virtual character on the website controlled by a different user via a remotely-located computer terminal 18. The user can input instructions into the user computer 16 to cause the virtual character 40 to issue a communication, displayed as a chat message in the present embodiment, that can be read by another user (the recipient) controlling another virtual character on the portion of the website where the virtual character 40 is present. Portions of the website include a chat interface 30 that the user can access to communicate with the other virtual character on the website. According to one embodiment, the chat interface 30 can include a plurality of categories of scripted phrases from which the sender can choose as content to be included in the chat message, the scripted messages being approved by an administrator of the website as being appropriate for the age of the users of the website. In FIG. 5, the categories "ASK" 42, "SAY" 44 and "RAP" 46 each include different types of phrases that the user can select to be included in the message to be presented to the other user in control of the other virtual character. The user can select any of these categories, revealing a menu of phrases from which the user can select the desired phrase. From this point forward, the user composing the message to be sent will be referred to as the sender, and the other user to whom the message is to be presented will be referred to as the recipient. For example, the ASK category 42 can include a plurality of pre-approved questions that can be asked of the recipient by the sender. These questions can optionally be specific to features of the website, such as asking the recipient their favorite activity on the website. According to alternate embodiments, however, the message field 50 can optionally be populated with free text entered via keyboard provided to the computer terminal 16 used by the sender.

Figure 6:
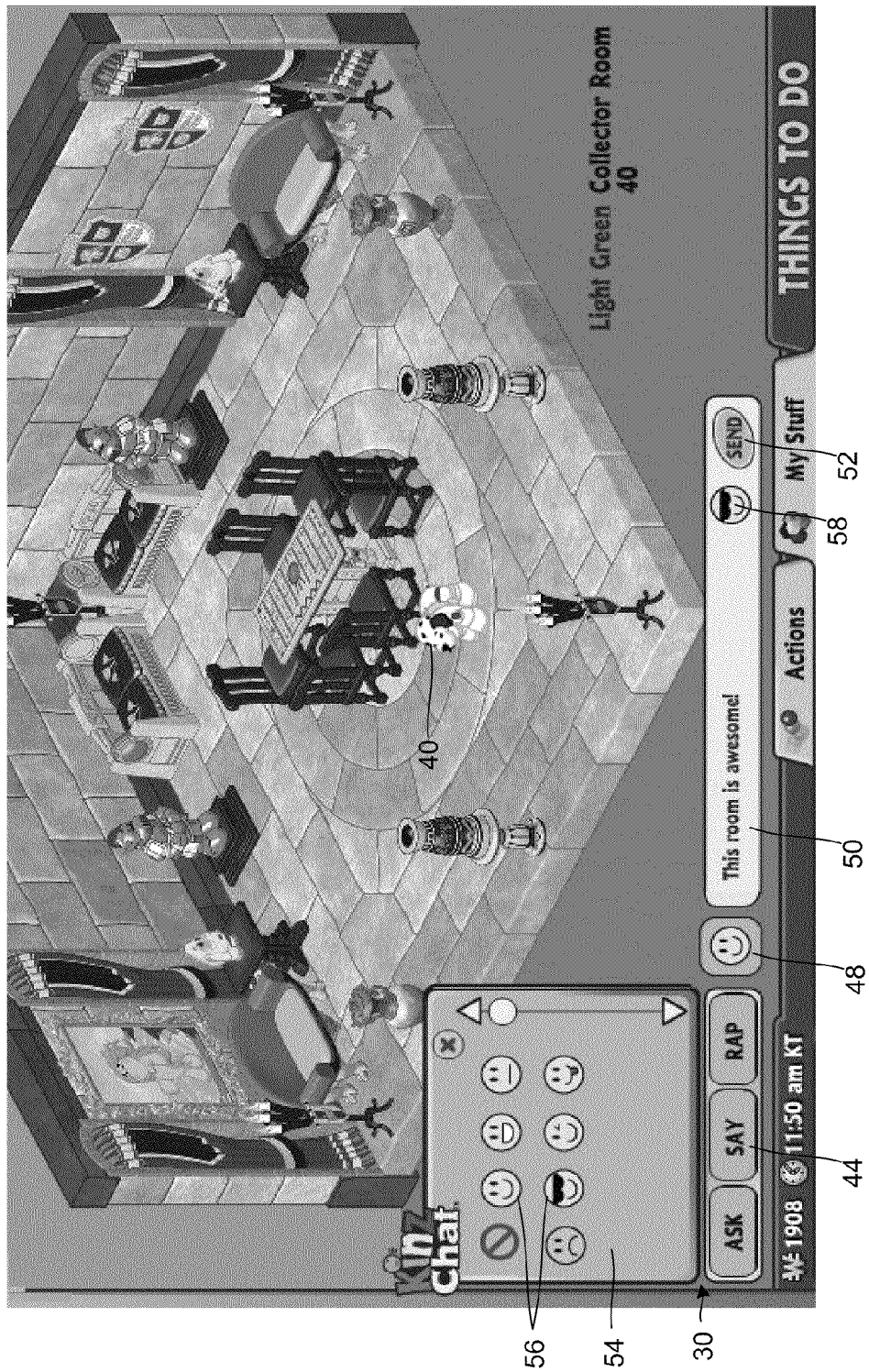
FIG. 6 shows the chat interface of FIG. 5 opened to reveal a graphic menu including a set of standard emoticons from which a sender can select at least one emoticon to be included in a message.

The chat interface 30 also includes a graphic interface 48 that the sender can select to insert a graphic such as one of the emoticons into the message to be presented to the recipient. As shown in FIG. 6, the sender has selected the statement "This room is awesome!" from the SAY 44 category, which has been added to the message field 50 that includes the content of the message that is to be presented to the recipient in response to the sender inputting the command to transmit the message by selecting the "SEND" button 52. In response to selection of the SEND button 52, the content input into the chat interface 30 on the website displayed by the user computer 16 by the sender is transmitted from the user computer 16 over the communication network 14 (FIG. 1) to be received by the server 12 and transmitted to the user computer 18 to be presented to the recipient.

FIG. 6 also illustrates a graphic menu 54 included as part of the chat interface 30, the graphic menu 54 including a plurality of standard emoticons 56 available to be added by the sender to the outbound chat message in response to selection of the graphic interface 48. The standard emoticons 56 can be made accessible to the sender for inclusion in chat messages upon gaining access to the website at 23, without requiring an additional action, such as registration of a code associated with a manufactured good, for example, on the part of the sender in addition to that required to gain access to the website. According to alternate embodiments, the standard emoticons can be made available to the sender in response to achieving a performance-based goal on the website. Regardless of how the sender gains access to the standard emoticons, however, at least one restricted emoticon 32 (FIG. 8) is not immediately available to the sender to be inserted into outbound messages along with the standard emoticons 56. The sender must first complete a qualifying action, such as registering a code associated with a manufactured good for example, before access to the restricted emoticon 32 is granted to the sender, allowing the sender to insert the restricted emoticon 32 into a chat message to be presented to the recipient following performance of the qualifying action. The message field 50 in FIG. 6 also includes an emoticon 58 wearing sunglasses, which has been selected by the sender from among the standard emoticons 56 in the graphic menu 54.

Figure 7:
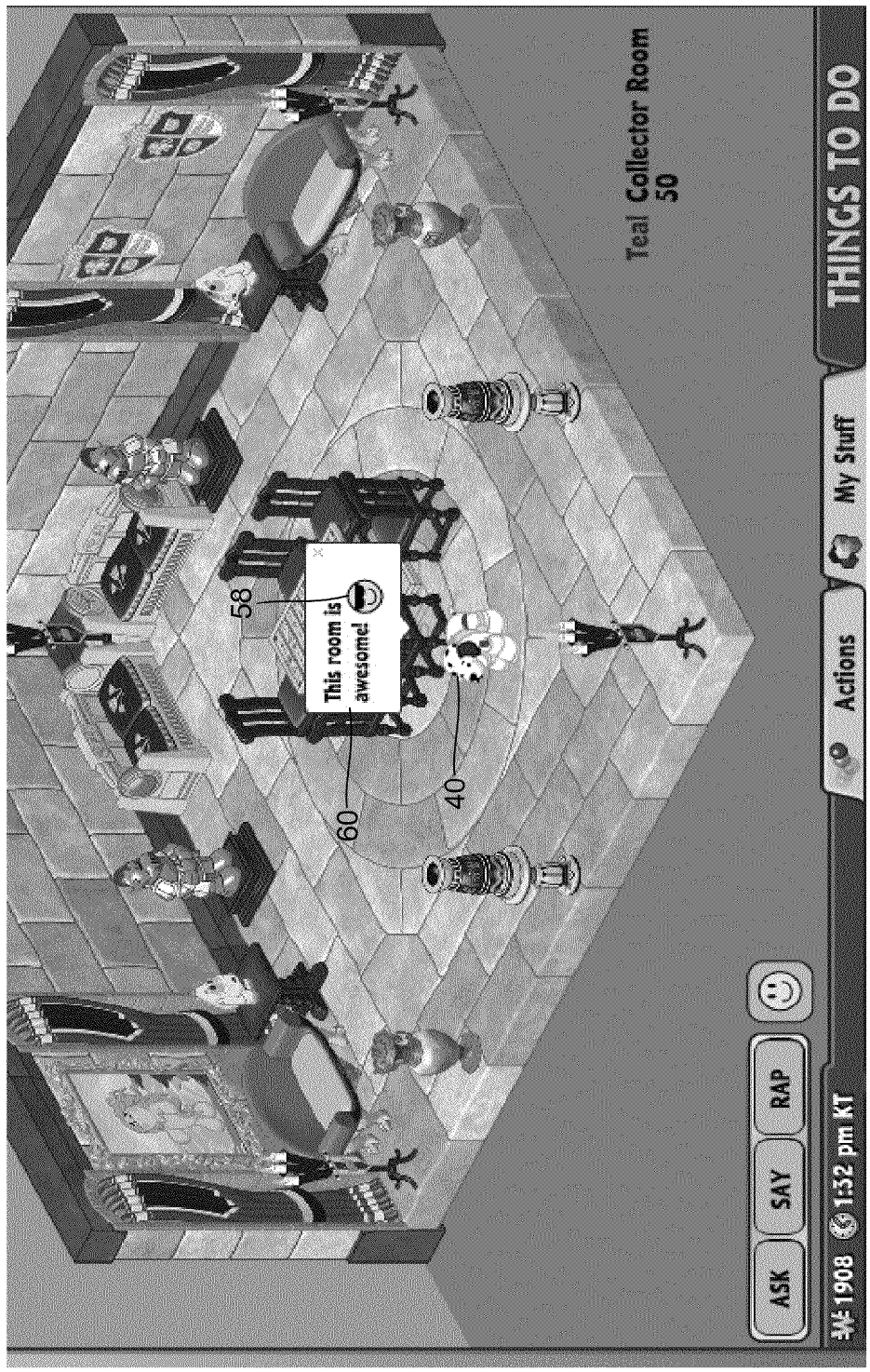
FIG. 7 shows an embodiment of a presentation of the message composed in FIG. 6 to a recipient.

When the content of the message is complete the sender can select the SEND button 52. In response to selection of the SEND button 52, the message in the message field 50 is transmitted from the computer terminal 16 (FIG. 1) being used by the sender over the communication network 14 to the server 12. The server 12 receives the message content and, in turn, transmits the message content over the communication network 14 to the recipient's computer terminal 18, where the message is broadcast in the comment balloon 60 to be viewed by the recipient as shown in FIG. 7. The comment balloon 60 can optionally be presented to all recipients controlling virtual characters in the portion of the website where the virtual character 40 controlled by the sender is located, or can be limited to specific intended recipients. As shown, the comment balloon 60 includes the text of the message entered into the message field 50 (FIG. 6) adjacent to the emoticon 58 wearing sunglasses selected by the sender from the menu 54 of standard emoticons 56.

Figure 8:
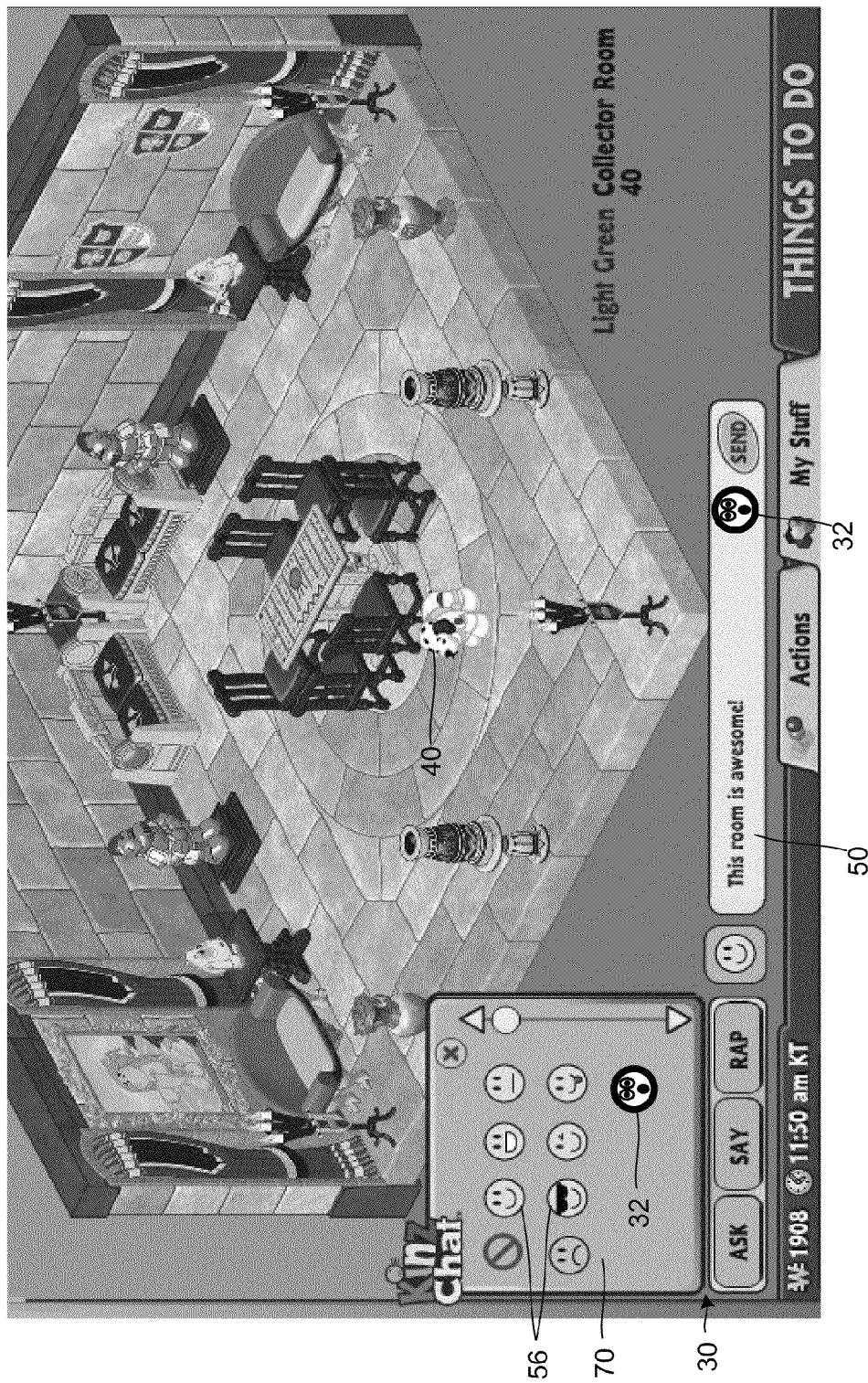
FIG. 8 shows an embodiment of the graphic menu including a restricted emoticon to which access was previously presented before registration of a product.

As explained above, the sender must first complete a qualifying action before being granted access to the restricted emoticon set 32 (FIG. 8), making the restricted emoticon set 32 available for inclusion in subsequent chat messages. That qualifying action can optionally be registration of a product purchased by the sender. For example, the sender may purchase an accessory to the toy the sender previously registered on the website. That toy could be one that the user registered to gain full access to the virtual character 40 on the website. Such an accessory can be accompanied by a code that the user can enter into a code registration field presented on the website to be transmitted over the communication network 14 and compared to a database of codes 26 (FIG. 2) for validation purposes. An example of such an accessory can be found in U.S. Patent Application Publication No. 2005/0059483 to Borge. In response to successful validation of such a code, the restricted emoticon 32 (FIG. 8) that the sender was previously prevented from selecting for inclusion in the message presented in FIG. 7, becomes available for selection from the new emoticon menu 70 of the chat interface 30 by the sender to be included in the message field 50 as shown in FIG. 8. The restricted emoticon 32 is shown as being available in addition to the standard emoticons 56, but was not visible in the graphic menu 4 shown in FIG. 6 prior to performance of the qualifying action. Although described above as an accessory to the toy registered to gain access to the website, the product registered to gain access to the restricted emoticon 32 can be any product associated with a code.

The restricted emoticon 32 has an appearance that is different than the appearance of the standard emoticons 56. One restricted emoticon 32 can optionally be added to the set standard emoticons 56, or a set comprising a plurality of different restricted emoticons 32 can optionally be added, and made available for selection by the sender in a chat message. Further, the one or plurality of different restricted emoticons 32 can optionally be changed periodically at the server 12 to make different restricted emoticons 32 available at different times. For instance, a seasonal restricted emoticon can be included in the graphic menu 54, and can optionally be included after the qualifying action has been performed, but such restricted emoticons can be omitted from the graphic menu 54 at times other than their respective seasons. For example a seasonal restricted emoticon can be included during a corresponding season, a holiday-themed restricted emoticon can be included during a corresponding holiday season, etc. . . . In an embodiment, at least one of the restricted emoticons is representative of a different emotion, giving the sender greater options in sending messages to recipients. A standard emoticon, a restricted emoticon, or a combination thereof can optionally include a facial appearance that is substantially similar to the facial appearance of the virtual character 40, or can optionally include a facial appearance that resembles the facial appearance of another character that appears elsewhere on the website. According to alternate embodiments, the standard emoticon, the restricted emoticon, or a combination thereof can optionally include an animated feature that is active during a presentation of the restricted graphic to a recipient of the second communication. For example, the emoticon can include an eye that blinks so as to wink to the recipient.

According to yet another embodiment, the emoticon can include a complexion that changes when displayed within the comment balloon 60 of FIG. 7, creating the appearance that the emoticon is blushing. Other embodiments can include an emoticon having an animated laugh when displayed in the comment balloon 60 emanating from the virtual character 40.

In response to successful registration of the product, the user account of the sender can be updated to reflect the successful registration of the product. Updating the sender's user account grants the sender continued access to the restricted emoticon or emoticon set. This allows the sender to log off of the website and, upon returning to and logging into the website, select the restricted graphic for inclusion in another message to be transmitted in real time during a subsequent synchronous communication session.

The sender, and optionally all users, can optionally be granted access to one or more, or a set including a plurality of seasonal emoticons for a limited period of time during the corresponding season. For example, a set of seasonal emoticons including a rabbit face, a duck face, a spring flower, and an Easter basket can be added to the graphic menu 54 of standard emoticons 56 shown in FIG. 6. Each of the seasonal emoticons can be personified with facial features that exhibit different expressions of emotion in a manner analogous to the different emotions exhibited in FIGS. 3a-3e and 4a-4e. Seasonal emoticons are prevented from being selected by users outside of the limited time period during the corresponding season, but once added to the graphic menu 54, access to such seasonal emoticons is granted to the users, allowing those seasonal emoticons to be added to the message field 50 as discussed above.

Other emoticons can include emoticons that resemble the character or item that the code registers. For example, a code that unlocks a bunny may create a bunny-looking emoticon.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of transmitting a graphic over a communication network, the method comprising:

using a computer operatively connected to the communication network, displaying a first graphic in a chat interface that a sender of a first chat message can select for inclusion in the first chat message prepared by the sender using the computer to be transmitted over the communication network to a recipient who is to receive the first chat message using another computer during a chat session, wherein the chat interface excludes from selection by the sender to be included in the first chat message a restricted graphic for inclusion in the first chat message, and is presented within a game environment where the sender and the recipient each control a virtual character during participation in an activity within the game environment;

using the computer, transmitting content of the first chat message entered by the sender into the chat interface over the communication network, the content comprising the first graphic;

in response to the sender registering a manufactured good based on a code associated with the manufactured good, displaying the chat interface comprising the restricted graphic to the sender with the computer and allowing selection by the sender of the restricted graphic for inclusion in a second chat message prepared with the computer to be transmitted over the communication network, wherein the first graphic and the restricted graphic each comprises an appearance that graphically conveys a different expression from the virtual character controlled by the sender within the game environment; and using the computer, transmitting the second chat message comprising the restricted graphic over the communication network to be delivered to a recipient of the second chat message to be presented to the recipient by a different computer connected to the communication network in a manner that suggests the virtual character controlled by the sender within the game environment issued the first chat message, and further comprising using the computer to display a seasonal graphic associated with a holiday to the sender during a corresponding holiday season, allowing the sender to select the seasonal graphic for inclusion in a seasonal chat message, wherein the computer does not present the seasonal graphic to the sender for selection in the seasonal chat message outside of the corresponding holiday season.

2. A computer comprising a non-transitory, computer-accessible memory and a processor, the computer being programmed with computer-executable instructions that, when executed by the processor, cause the computer to perform a method comprising:

displaying a first graphic in a chat interface that a sender of a first chat message can select for inclusion in the first chat message prepared by the sender using the computer to be transmitted over a communication network to a recipient who is to receive the first chat message using another computer during a chat session, wherein
chat interface displayed by the computer excludes from selection by the sender to be included in the first chat message a restricted graphic for inclusion in the first chat message, and is presented within a game environment where the sender and the recipient each control a virtual character during participation in an activity involving navigation of the game environment using the virtual character controlled by the sender;
transmitting content of the first chat message entered by the sender into the chat interface over the communication network, the content comprising the first graphic;
in response to the sender registering a manufactured good based on a code associated with the manufactured good, displaying the chat interface comprising the restricted graphic to the sender and allowing selection by the sender of the restricted graphic for inclusion in a second chat message prepared using the computer to be transmitted over the communication network, wherein the first graphic and the restricted graphic each comprises an appearance that graphically conveys a different expression from the virtual character controlled by the sender within the game environment;
transmitting the second chat message comprising the restricted graphic over the communication network to be delivered to a recipient of the second chat message to be presented to the recipient by a different computer connected to the communication network in a manner that suggests the virtual character controlled by the sender within the game environment issued the second chat message;
displaying a seasonal graphic associated with a holiday to the sender during a corresponding holiday season; and
allowing the sender to select the seasonal graphic for inclusion in a seasonal chat message, wherein the seasonal graphic is not presented to the sender for selection in the seasonal chat message outside of the corresponding holiday season.

3. A method of transmitting a graphic over a communication network, the method comprising:
using a computer operatively connected to the communication network, displaying a first graphic in a chat interface that a sender of a first chat message can select for inclusion in the first chat message prepared by the sender using the computer to be transmitted over the communication network to a recipient who is to receive the first chat message using another computer during a chat session, wherein the chat interface excludes from selection by the sender to be included in the first chat message a restricted graphic for inclusion in the first chat message;
using the computer, transmitting content of the first chat message entered by the sender into the chat interface over the communication network, the content comprising the first graphic;
in response to the sender registering a manufactured good based on a code associated with the manufactured good, displaying the chat interface comprising the restricted graphic to the sender with the computer and allowing selection by the sender of the restricted graphic for inclusion in a second chat message prepared with the computer to be transmitted over the communication network;
using the computer, transmitting the second chat message comprising the restricted graphic over the communication network to be delivered to a recipient of the second chat message; and
using the computer to display a seasonal graphic associated with a holiday to the sender during a corresponding holiday season, allowing the sender to select the seasonal graphic for inclusion in a seasonal chat message, wherein the computer does not present the seasonal graphic to the sender for selection in the seasonal chat message outside of the corresponding holiday season.

4. A computer comprising a non-transitory, computer-accessible memory and a processor, the computer being programmed with computer-executable instructions that, when executed by the processor, cause the computer to perform a method comprising:
displaying a first graphic in a chat interface that a sender of a first chat message can select for inclusion in the first chat message prepared by the sender using the computer to be transmitted over a communication network to a recipient who is to receive the first chat message using another computer during a chat session, wherein
the chat interface displayed by the computer excludes from selection by the sender to be included in the first chat message a restricted graphic for inclusion in the first chat message;
transmitting content of the first chat message entered by the sender into the chat interface over the communication network, the content comprising the first graphic;
in response to the sender registering a manufactured good based on a code associated with the manufactured good, displaying the chat interface comprising the restricted graphic to the sender and allowing selection by the sender of the restricted graphic for inclusion in a second chat message prepared using the computer to be transmitted over the communication network;
transmitting the second chat message comprising the restricted graphic over the communication network to be delivered to a recipient of the second chat message;
displaying a seasonal graphic associated with a holiday to the sender during a corresponding holiday season; and
allowing the sender to select the seasonal graphic for inclusion in a seasonal chat message, wherein the seasonal graphic is not presented to the sender for selection in the seasonal chat message outside of the corresponding holiday season.

* * * * *

UNITED STATES PATENT AND TRADEMARK OFFICE
CERTIFICATE OF CORRECTION

PATENT NO. : 8,788,943 B2  Page 1 of 1
APPLICATION NO. : 12/780372
DATED : July 22, 2014
INVENTOR(S) : Borst et al.

It is certified that error appears in the above-identified patent and that said Letters Patent is hereby corrected as shown below:

In the Claims
Claim 2, column 11, line 4, "chat interface displayed by the computer excludes from" should read
-- the chat interface displayed by the computer excludes from --

Signed and Sealed this
Twenty-first Day of October, 2014

Michelle K. Lee
*Deputy Director of the United States Patent and Trademark Office*